(12) United States Patent
Zowislok et al.

(10) Patent No.: US 10,056,843 B2
(45) Date of Patent: Aug. 21, 2018

(54) METHOD AND DEVICE FOR SUPPLYING ENERGY TO A LOW-VOLTAGE LOAD

(71) Applicant: ABB Schweiz AG, Baden (CH)

(72) Inventors: Florian Zowislok, Seelbach (DE); Dirk Lill, Freiburg im Breisgau (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/671,164

(22) Filed: Aug. 8, 2017

(65) Prior Publication Data

US 2017/0338642 A1 Nov. 23, 2017

Related U.S. Application Data

(63) Continuation of application No. PCT/EP2016/055987, filed on Mar. 18, 2016.

(30) Foreign Application Priority Data

Apr. 10, 2015 (DE) .................. 10 2015 105 476

(51) Int. Cl.
*H02M 3/335* (2006.01)
*H02H 1/04* (2006.01)
(Continued)

(52) U.S. Cl.
CPC ........ *H02M 3/33546* (2013.01); *H02H 1/043* (2013.01); *H02H 3/087* (2013.01);
(Continued)

(58) Field of Classification Search
CPC ................... H02M 1/08; H02M 2001/0009
See application file for complete search history.

(56) References Cited

U.S. PATENT DOCUMENTS 5,714,847 A * 2/1998 Lindauer .................. G05F 1/66
315/291
2006/0244430 A1* 11/2006 Hirabayashi .......... H02M 3/157
323/224

(Continued)

FOREIGN PATENT DOCUMENTS

DE 102005031833 A1 1/2007
EP 0302470 A2 8/1989

*Primary Examiner* — Yusef A Ahmed
(74) *Attorney, Agent, or Firm* — Leydig, Voit & Mayer, Ltd.

(57) ABSTRACT

A method and a device for supplying energy to a low-voltage load using an electronic power supply device. The method involves: a) setting the power supply device to be able to provide an output current to the low-voltage load up to a specified peak current value upon demand; b) monitoring the output current ($I_L$) provided to the low-voltage load by the electronic power supply device to detect an increase of $I_L$ over a threshold ($I_N$) which is lower than the peak current value, c) if an increase of $I_L$ to an increased output current value higher than $I_N$ is detected, detecting the increased $I_L$ value and ascertaining an output current pulse duration ($t_{Pulse}$) based on the increased current value; d) providing $I_L$ at the level of the increased current value for the duration of the ascertained $t_{Pulse}$; and e) providing the $I_L$ at the level of $I_N$ after $t_{Pulse}$ has expired.

8 Claims, 8 Drawing Sheets

(51) Int. Cl.
*H02H 3/087* (2006.01)
*H02H 9/00* (2006.01)
*H02H 3/10* (2006.01)
*H02M 1/08* (2006.01)
*H02M 1/00* (2006.01)

(52) U.S. Cl.
CPC .......... *H02H 3/105* (2013.01); *H02H 9/002* (2013.01); *H02H 9/008* (2013.01); *H02M 1/08* (2013.01); *H02M 2001/0009* (2013.01)

(56) References Cited

U.S. PATENT DOCUMENTS

| | | | | |
|---|---|---|---|---|
| 2006/0273740 | A1* | 12/2006 | Saeueng | H02J 1/102 315/291 |
| 2007/0008664 | A1* | 1/2007 | Zeuch | H02H 3/025 361/18 |
| 2007/0076456 | A1* | 4/2007 | Lim | H02M 3/335 363/73 |
| 2009/0116265 | A1* | 5/2009 | Saji | H02M 3/33507 363/37 |
| 2010/0270932 | A1* | 10/2010 | Onishi | H05B 41/295 315/119 |
| 2011/0019322 | A1* | 1/2011 | Akama | H02M 1/32 361/93.1 |
| 2011/0205770 | A1* | 8/2011 | Isogai | H02M 1/32 363/78 |
| 2012/0072739 | A1* | 3/2012 | Isaacson | H02H 3/0935 713/300 |
| 2012/0286754 | A1* | 11/2012 | Chen | H02M 3/1588 323/284 |
| 2013/0229832 | A1* | 9/2013 | Patel | H02M 3/33507 363/21.12 |
| 2013/0294111 | A1* | 11/2013 | Persson | H02M 1/32 363/16 |
| 2014/0125304 | A1* | 5/2014 | Wiethege | H02M 3/1563 323/282 |
| 2014/0139021 | A1* | 5/2014 | Han | H02M 3/33561 307/31 |
| 2014/0226369 | A1* | 8/2014 | Kimura | H02M 3/3376 363/21.09 |
| 2014/0313790 | A1* | 10/2014 | Feng | H02M 1/36 363/21.02 |
| 2015/0130372 | A1* | 5/2015 | Chitta | H02M 1/08 315/307 |
| 2015/0138851 | A1* | 5/2015 | Yonezawa | H02M 1/4225 363/44 |
| 2015/0236590 | A1* | 8/2015 | Yonezawa | H02M 1/08 323/271 |
| 2015/0349646 | A1* | 12/2015 | Karlsson | H02M 3/33501 363/21.01 |
| 2015/0372606 | A1* | 12/2015 | Tamura | H02M 3/33584 363/21.04 |
| 2016/0198532 | A1* | 7/2016 | Nakajo | H02M 1/36 315/200 R |
| 2016/0285356 | A1* | 9/2016 | Schuermann | H02M 1/32 |
| 2016/0294273 | A1* | 10/2016 | Kawamura | H02M 3/33523 |
| 2017/0201176 | A1* | 7/2017 | Onishi | H02M 3/158 |

* cited by examiner

METHOD AND DEVICE FOR SUPPLYING ENERGY TO A LOW-VOLTAGE LOAD

CROSS-REFERENCE TO RELATED APPLICATIONS

This application is a bypass continuation of International Application No. PCT/EP2016/055987, filed on Mar. 18, 2016, claiming benefit to German Patent Application No. DE 10 2015 105 476.0, filed on Apr. 10, 2015, the entire disclosure of each of which is hereby incorporated by reference herein. The International Application was published in German on Oct. 13, 2016, as WO 2016/162186 A1 under PCT Article 21(2).

FIELD

The invention relates to a method for supplying energy to a low-voltage load using an electronic power supply device.

BACKGROUND

In industrial installations, low-voltage loads, such as e.g. control circuits, amplifiers and similar, are supplied with a DC voltage which is non-hazardous to persons, preferably of 24 V. Appropriate power supply devices for the supply of such a DC voltage can deliver output currents of 20 A or more. At such high currents, protective devices, such as e.g. fuses or circuit-breakers, must be connected in series with the respective loads, in order to protect the latter, and specifically the supply conductors thereof, against thermal overloads or short-circuit currents. In order to permit the secure magnetic tripping of circuit-breakers upon the occurrence of an electrical fault, for example a short-circuit, tripping currents are required which are approximately 7.5 times the rated current specified for the power supply device. The trip behavior of circuit-breakers is defined by the time/current tripping characteristic thereof, for example the B characteristic. With customary dimensioning, conventional 50 Hz transformers which are employed as power supply devices can, in the event of a short-circuit, deliver high tripping currents of this type for circuit-breakers. On the grounds of high electrical losses and the heavy weight, 50 Hz transformers of this type in industrial power supplies are increasingly being replaced by electronic power supply devices, such as e.g. switched-mode power supplies with a high switching frequency. However, upon the occurrence of an electrical disturbance, electronic power supply devices customarily restrict the output current very rapidly, i.e. between 10 and 100 μsec, to between 1.1 and 1.5 times the rated current value, in order to protect loads and supply conductors against thermal overloads and short-circuit currents. Accordingly, the secure tripping of an electromagnetic protection device cannot always be guaranteed.

An increased output-side energy demand is not only associated with a fault, such as the aforementioned short-circuit. The switching-in of loads, for example the start-up of an electric motor, can also result in a short-term increase in energy demand on the output side of the power supply device. In this case, reference would generally be made to a special condition involving increased energy demand. A malfunction, such as the aforementioned short-circuit, is an extreme manifestation of such a special condition.

Upon the switching-in of a large capacitive load, the output voltage dips rapidly, then rises again, as a function of the loop impedance and capacitance. Upon the switching-in of an ohmic-inductive load, for example a motor, a high start-up current flows, which is only limited by the ohmic resistance of the motor winding. Customarily, normal operation is restored within a few seconds. During the transition time, however, the load can draw output currents from the power supply device which are substantially in excess of 1.5 times, but lower than the value of 6 to 7.5 times the rated current value which is required for the tripping of the protective device, and for a variable and load-dependent time interval which cannot be predetermined.

From DE 10,2005,031,833 A1, a method is known for supplying energy to a low-voltage load which is protected by a protective device, by means of an electronic power supply device—a switched-mode power supply—whereby the input and/or output voltage of the power supply device is monitored, in order to detect a drop in the input and/or output voltage below a threshold. Upon the detection of a drop in the input and/or output voltage below the threshold, a current is delivered for a predetermined time interval, the magnitude of which is rated for the secure tripping of the protective device and, upon the expiry of the predetermined time interval, the current is limited to a lower value. According to the prior art, a drop in the input or output voltage below a threshold is interpreted as an indication of a malfunction or a special situation and, and in response thereto, an increased output current is delivered, which is sufficiently high to ensure the secure tripping of a protective device. In this arrangement, a response of the power supply device which is adapted to a specific type of malfunction or special condition is not possible. The prior art does not distinguish between a special condition which involves, for example, a short-circuit or a motor start-up.

SUMMARY

An aspect of the invention provides a method for supplying energy to a low-voltage load using an electronic power supply device, the method comprising: a) setting up the power supply device so as to be able to provide an output current to the low-voltage load up to a specified peak current value upon demand; b) providing the output current to the low-voltage load by the electronic power supply device is monitored, in order to detect an increase in the output current above a threshold which is lower than the peak current value; c) if an increase in the output current to an increased output current value which is higher than the threshold is detected, detecting the increased output current value, and ascertaining an output current pulse duration based on the increased current value; d) providing the output current at a level of the increased current value for the duration of the output current pulse duration ascertained; and e) providing the output current at the level of the threshold, after the output current pulse duration has expired.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention relates to a method for supplying energy to a low-voltage load using an electronic power supply device. A further aspect of the invention relates to an electronic power supply device for supplying energy to a low-voltage load by the delivery of a DC output voltage and an output current up to a peak current value. An aspect of the invention specifically relates to a switched-mode power supply for supplying energy to a low-voltage load, which is protected by a protective device, and to a method for this purpose.

An aspect of the present invention provides a method for supplying energy to a low-voltage load using an electronic power supply which, in response to the occurrence of a special condition in the downstream circuit, rapidly generates an increased output current which is adapted to the requirements arising from the type of said special condition.

An aspect of the present invention provides an electronic power supply device for supplying energy to a low-voltage load by the delivery of a DC output voltage and an output current, by means of which the method according to the invention can be executed.

An aspect of the invention provides a method comprising the following steps:
a) the power supply device is set up so as to be able to provide an output current to the low-voltage load up to a specified peak current value upon demand,
b) the output current provided to the low-voltage load by the electronic power supply device is monitored, in order detect an increase in the output current above a threshold which is lower than the peak current value,
c) if an increase in the output current to an increased output current value which is higher than the threshold is detected, the increased output current value is detected, and an output current pulse duration is ascertained on the basis of the increased current value,
d) the output current is provided at the level of the increased current value for the duration of the ascertained output current pulse duration,
e) the output current is provided at the level of the threshold, after the output current pulse duration has expired.

The predefined peak current value corresponds to the peak load capability of the power supply device. In a switched-mode power supply, this capability is, for example, 6 times the rated current. A 10 A switched-mode power supply, for example, thus has a peak load capability of 60 A.

According to an aspect of the invention, the power supply device, upon demand, can thus deliver an output current which, from the outset, corresponds to the peak current value. There is no initial current limitation to 1.5 times the rated current, as provided and known in switched-mode power supplies from the prior art. An advantage is provided in that, upon the occurrence of a special situation, for example the start-up of a motor, where the load requires an output current from the switched-load power supply which is greater than 1.5 times the rated current, for example 30 A, this increased current can be made available directly and without delay.

By means of characteristic b) according to the invention, a special situation is detected, wherein the output current is measured. The threshold, for example at an output current of 1.5 times the rated value, in a 10 A switched-mode power supply is, for example, 15 A. Consequently, if the connected load "draws" a current in excess of 15 A, this indicates the occurrence of a special situation, for example a motor start-up or a short-circuit in the connected power circuit. The detection of the special situation with reference to the current characteristic has an advantage, in that special situations are also detected, in which the output voltage does not dip initially, as in the case, for example, of an inductive or resistive load, such as a motor start-up. Moreover, a special situation can be detected more rapidly by the measurement of the output current than by the measurement of the output voltage, as the rise in current precedes the drop in the output voltage.

Characteristics c) and d) ensure that the output current is delivered at the level required by the load in the special situation, and for a pulse duration which is appropriate to the level of the requisite output current. A load-related current delivery is advantageously provided accordingly.

In an advantageous further development, the output current pulse duration is longer, the lower the increased output current value.

In order to prevent an overload of the switched-mode power supply, the output current is only limited to the threshold, for example 1.5 times the rated current, further to the expiry of the ascertained load-related pulse duration.

In an advantageous further development of the invention, the delivery of the output current at the level of the threshold, further to the expiry of the output current pulse duration, can be set for the duration of a predefined recovery time and, further to the expiry of the recovery time, the power supply device is reset so as to deliver, upon demand, an output current to the low-voltage load up to the predefined peak current value. This has an associated advantage, in that components of the switched-mode power supply can cool down during the recovery time and, if the special situation has yet to be eliminated upon the expiry of the recovery time, the increased output current is delivered for the duration of a further output current pulse duration, and so forth, until such time as the special situation is cleared. The clearance of the special situation, for example in the case of the motor start-up, can be provided in that the motor has achieved its rated speed or, in the case of a short-current, that the protective device has responded, and the corresponding power circuit has been switched-out.

According to an advantageous form of embodiment of the invention, the recovery time is determined in relation to the increased output current value. This has an associated advantage, in that the recovery time is adapted to the load during the special condition, and the method can thus respond in a highly flexible manner to the actual load conditions in force in each case. In the case of a short-circuit, for example, with the maximum possible output current, the recovery time must be longer than in the case of a motor start-up, which is associated with a slightly raised current demand, for example, of two times the rated current. In this case, the recovery time can be shorter such that, overall, the duration of the special condition is shortened.

If, according to an advantageous form of embodiment of the invention, a protective device is provided for the protection of the low-voltage load, for example a circuit-breaker with an electromagnetic short-circuit current trip element, the peak current value is set sufficiently high to ensure the secure tripping of the protective device, preferably within a time which is shorter than the output current pulse duration.

In an advantageous further development of the invention, if the output current achieves or undershoots the threshold prior to the expiry of the output current pulse duration, the power supply device is set up so as to be able to provide an output current up to the level of the threshold. This means that, further to the undershoot of the threshold, for example of 1.5 times the rated output current value, the present current pulse is interrupted, as the special situation is then manifestly terminated, and there are no grounds for continuing to deliver the increased current value up to the end of the output current pulse duration. By this measure, in the event that a system comprises a plurality of parallel-connected power supplies, any potential oscillation of this system is prevented.

An electronic power supply device for supplying energy to a low-voltage load by the delivery of a DC output voltage and an output current up to a peak current value is characterized in that an apparatus is provided which, in response to an increase in the output current above a predefined threshold, detects the increased output current, determines an output current pulse duration in relation to the increased output current, delivers the increased output current for the duration of the output current pulse duration and, further to the expiry of the output current pulse duration thus determined, delivers the output current at the level of the threshold.

In an advantageous configuration, an electronic power supply device according to the invention is an electronic switched-mode power supply, and the apparatus incorporates a DC voltage converter with an adjustable energy transmission ratio and a current measuring device for the monitoring of the output current, and a setting apparatus for the setting of the energy transmission ratio in relation to the output current thus determined. In an advantageous form of embodiment, the DC voltage converter is a half-bridge LLC resonant converter.

In an advantageous form of embodiment of the invention, the setting apparatus for the setting of the energy transmission ratio influences the working frequency of the half-bridge LLC resonant converter.

The invention is described in greater detail hereinafter with reference to an exemplary embodiment, in conjunction with the attached drawings.

Figure 1:
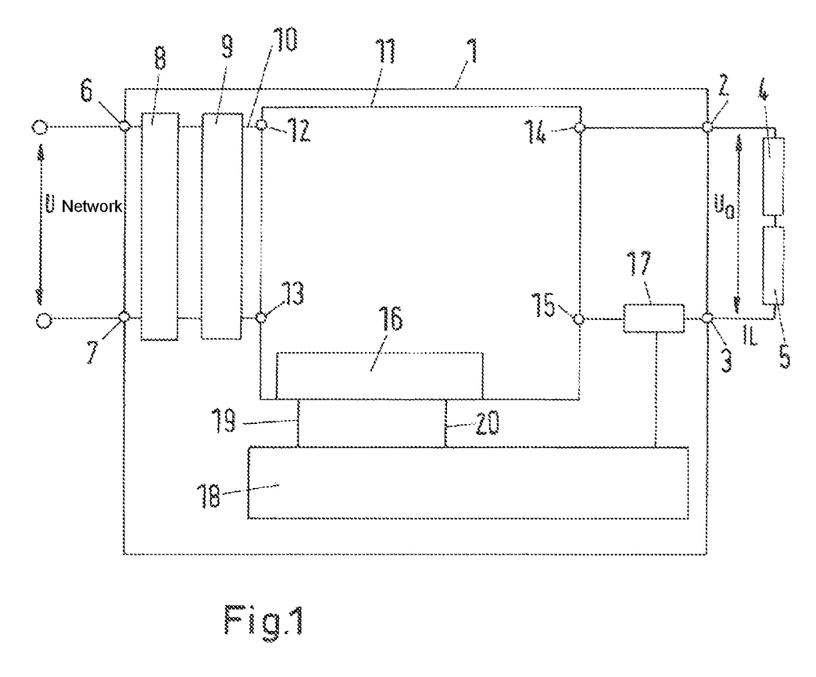
FIG. 1 a schematic representation of a device for supplying energy to a low-voltage load according to the invention.

FIG. 1 shows an exemplary representation of an energy supply system, having an electronic power supply device 1, on the output terminals 2, 3 of which a low-voltage load 4 is connected, which is symbolically represented by a resistor. A protective device 5 is connected in series with the low-voltage load 4, in the present example an electromagnetic circuit-breaker.

On its output terminals 2, 3, the electronic power supply device 1 delivers, for example, a DC voltage $U_A$ of 24V, in rated duty, and a DC output current $I_L$. Although, in FIG. 1, only one low-voltage load 4 is connected to the electronic power supply device 1, a plurality of loads can naturally be connected to the electronic power supply device 1, preferably in parallel. A dedicated circuit-breaker can then be assigned to each load.

The electronic power supply device 1 can be a switched-mode power supply, which is supplied with a network voltage UNetwork on two input terminals 6, 7. The power supply device 1 incorporates a rectifier circuit 8 which is assigned to the input terminals 6, 7, and a power factor conditioning circuit 9, also known as a PFC circuit. Via an internal HV-DC bus 10, the rectified input voltage is fed to the input terminals 12, 13 of a DC converter 11, also known as a DC/DC converter. The DC/DC converter 11 converts the high input voltage, for example 300V DC, into the requisite low output voltage of 24V DC, and the DC/DC converter 11 delivers the requisite DC output current IL on the output terminals 2, 3.

In the present example, a half-bridge LLC resonant converter is employed as the DC/DC converter 11. The working principle, physical properties and mode of operation of a half-bridge LLC resonant converter are known for example, from Bob Yang, Fred C. Lee, Alpha J. Zhang, Guisong Huang, LLC resonant Converter for Front End DC/DC Conversion, published on the Internet at http://www.cpes.vt.edu/_media/annual_reports/2002/Report/VolumeII-PartII/1DPS/4.pdf. The DC/DC converter incorporates a converter setting apparatus 16, by means of which manipulated variable values are communicated to the converter 11 for the maximum direct current $I_L$ delivered at the converter output terminals 14, 15 thereof. Thus, to a certain extent, the energy transmission ratio of the DC voltage converter between its input terminals 12, 13 and its output terminals 14, 15 is adjustable.

The power supply device 1 incorporates a current measuring device 17, which detects the DC output current IL delivered by the DC/DC converter. The current measuring device 17 can be a current sensor which is known in principle, for example a measuring shunt, across which the voltage drop is measured which is proportional to the current flowing through the measuring shunt, or an inductive current sensor, or a Hall effect sensor, etc. This value is transmitted to a control logic circuit 18. From the output current IL detected, the magnitude and the time characteristic thereof, the control logic circuit 18 determines two manipulated variables for the converter setting apparatus 16. A first manipulated variable 19 limits the current delivered by the DC/DC converter to a threshold IN which for example corresponds to 1.5 times the rated current, in the present example 1.5×10 A=15 A. A second manipulated variable 20 limits the current delivered by the DC/DC converter to a peak current value, which corresponds to the maximum thermal peak load capability of the components, in the present example a value to the magnitude of six times the rated current, or 60 A.

By means of the second manipulated variable, a load connected on the output terminals 2, 3 of the power supply device, depending upon the magnitude thereof, can "draw" a current up to a limit of 60 A. If, under a first load condition, the load 4 is, for example, 1.6 ohms, at an output voltage of 24V, the switched-mode power supply 1 would deliver an output current $I_L$ of 15 A, if the second manipulated variable is fed to the converter setting apparatus 16. If the load resistance 4 falls, for example, to 1.2 ohms, the output current $I_L$ delivered will increase to 20 A. If the load resistance 4 falls further, for example to 0.8 ohms, the output current delivered will increase to 30 A. Assuming a further drop in the load resistance to 0.4 ohms, the output current delivered would even increase up to 60 A. Such a low load resistance of 0.4 ohms or less can occur, for example, in conjunction with an incipient short-circuit in the load circuit. Although the output voltage $U_A$ is still then at its rated value of 24V, the switched-mode power supply 1 according to the invention, with no delay, delivers an output current of 60 A, which can be sufficient to trip the protective device 5, thereby switching-out the short-circuit.

However, the control logic circuit 18 is configured such that the increased output current $I_L$, if it exceeds the threshold IN, cannot be delivered indefinitely, but only for a short time interval, described here as the output current pulse duration $t_{pulse}$. The output current pulse duration is determined in the control logic circuit 18, in relation to the quantitative value of the output current $I_L$. This duration is shorter, the greater the output current $I_L$ required by the load 4. If the output current pulse duration is achieved, the control logic circuit 18 of the converter setting apparatus 16 makes the first manipulated variable 19 available in place of the second manipulated variable 20, such that the DC/DC converter only delivers an output current at the threshold, in the present example 1.5 times the rated current.

The control logic circuit can be configured as an electronic hardware circuit. It can also be configured in the form of software; the control logic circuit will then comprise a microprocessor with a correspondingly configured application program.

Figure 2:
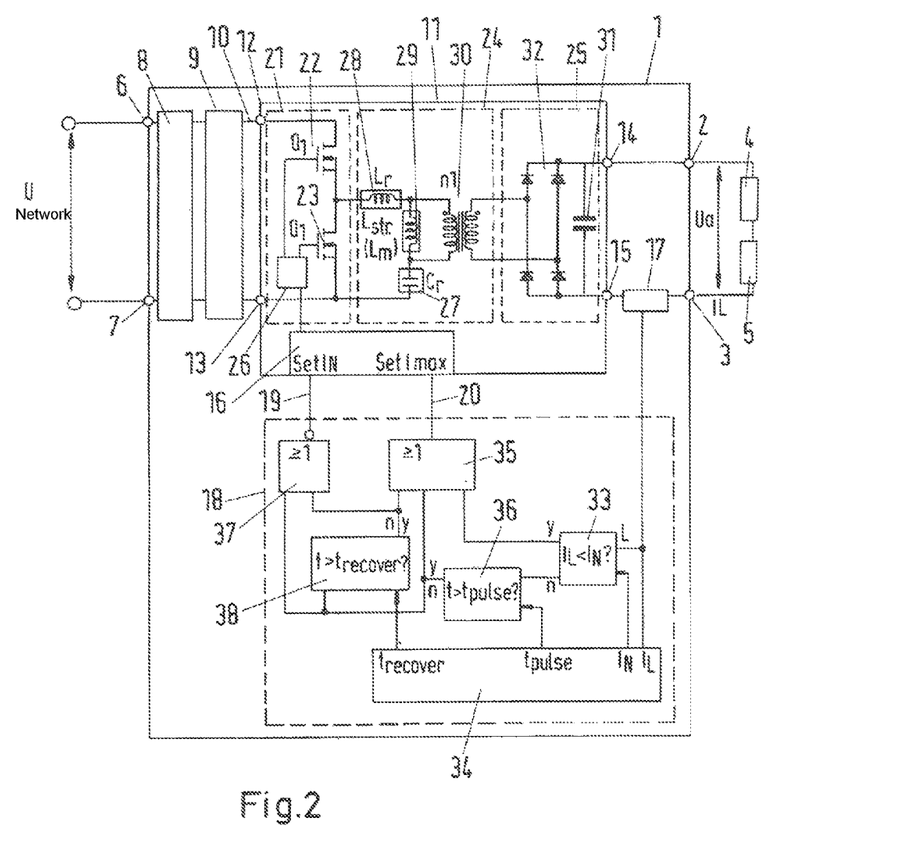
FIG. 2 a schematic representation of a further form of embodiment of a power supply for a low-voltage load according to the invention.

FIG. 2 will now be considered. This shows a schematic representation of the topology of a DC voltage converter 11, which is configured as an LLC resonant converter. The topology of the LLC resonant converter comprises three stages: a square-wave generator 21, a resonant network 24 and a rectifier network 25.

The square-wave generator 21 generates a square-wave voltage, wherein a control circuit 26 actuates two switches 22 and 23, configured here as MOSFETs, in an alternating manner, with a pulse duty factor of 50%. The square-wave generator 21 can be configured as a half bridge, as represented here, or as a full bridge.

The resonant network 24 is comprised of a capacitor 27, a series-mode stray inductance 28, and the magnetizing inductance 29 of a high-frequency transformer 30. The Q-factor of the resonant network is influenced by these three components, and by the external load 4. The smaller the ohmic component of the external load and, in consequence, the higher the output current required by the load at a constant output voltage, the higher the Q-factor will be. In the case of a short-circuit in an external load-circuit, the resistance is very small, and the requisite output current and the Q-factor of the resonant circuit 24 are correspondingly high. Likewise, in the case of the high-inertia start-up of an electric motor, the requisite output current and the Q-factor are high. In the application described here, the LLC resonant circuit 24 is operated in the zero-voltage switching (ZVS) range, i.e. the switchover of the MOSFETs occurs at the zero-crossing of the voltage. The converter setting apparatus ensures that operation in the zero-current switching (ZCS) range, i.e. switching at the zero-crossing of the current which, in principle, is also possible, is prevented. The LLC resonant circuit has two resonant frequencies, a first and a second resonant frequency. The second resonant frequency is lower than the first resonant frequency. The square-wave generator is controlled such that the working frequency is maintained in the vicinity of the first resonant frequency. In this case, the amplification of the LLC resonant circuit is virtually independent of the external load, which is an advantage of LLC topology. By the adjustment of the working frequency away from the first resonant frequency, the amplification of the LLC resonant circuit, and thus the energy transmitted or the deliverable output current on the output, can be influenced. By means of the manipulated variables 19 and 20, the converter setting apparatus 16 therefore influences the working frequency of the LLC resonant circuit dictated by the control circuit 26 of the square-wave generator 21. The working frequency of the LLC resonant circuit is thus determined by the maximum value of the output current at a given DC output voltage $U_A$. Expressed in simple terms, the setting of the energy transmission ratio, and thus the setting of the maximum direct current $I_L$ available for take-up on the output terminals of the DC/DC converter, is achieved by the setting of the oscillating circuit frequency of the LLC resonant converter.

The rectifier network 25 rectifies the AC voltage present on the output of the HF transformer back to a DC voltage. In this case, it is configured as a full-bridge rectifier 32 with a smoothing capacitor 31.

Figure 3:
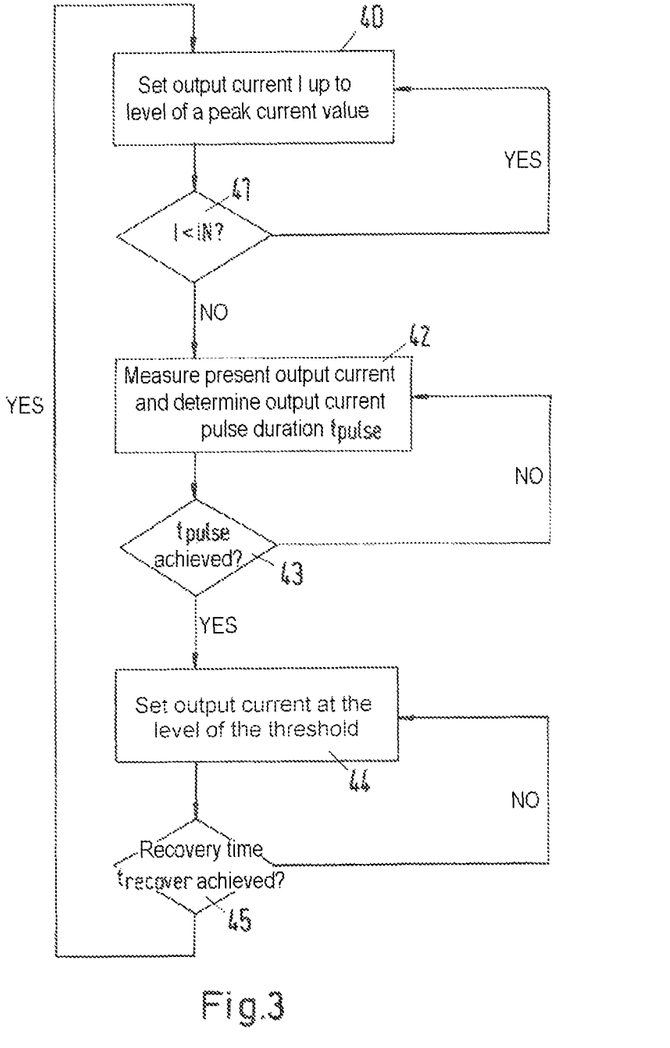
FIG. 3 a flow diagram of the method according to the invention for supplying energy to a low-voltage load according to the invention.

FIG. 3 will now be considered. This clarifies how the method according to the invention for supplying energy to a low-voltage load 4 using an electronic power supply device 1 can be executed, by means of the electronic power supply device 1 according to FIGS. 1 and 2. In the description of the method according to the invention represented in FIG. 3, reference is also made to an exemplary implementation of these process steps in the control logic circuit 18. To this end, within the control logic circuit 18, FIG. 2 shows a purely exemplary and schematic representation of a potential arrangement and interconnection of functional modules, in part meters, in part logic gates, and in part complex control switching elements. The actual execution of the method according to the invention in an electronic circuit, or by means of an application software for a microprocessor, can also incorporate and include differing functional modules or program modules of different design and/or of different composition.

In a first step 40, the power supply device 1 is set up so as to be able to provide, upon demand, an output current to the low-voltage load 4 up to a predefined peak current value. In the example described above, the peak current value is six times the rated current, or 60 A in a 10 A switched-mode power supply. The output voltage $U_a$ is 24V and, depending upon the magnitude of the load 4, the latter draws the requisite current, which can be lower than the rated current, but also higher. The power supply delivers a current which is only limited by its own peak load capability. The resulting short-term peak current value corresponds to six times the rated current. The resulting short-term peak current value can thus be sufficiently high such that the protective device 5, in the present example an electromagnetic short-circuit current trip element, is securely tripped.

The output current $I_L$ delivered by the electronic power supply device to the low-voltage load 4 is monitored, in order to detect an increase in the output current $I_L$ above a threshold $I_N$, which is lower than the peak current value. Independently of the ambient temperature and the site of installation, the power supply can continuously deliver 1.5 times the rated current, in order to support prolonged overload phases. The threshold $I_N$ is therefore set at 1.5 times the rated current. The output current IL is detected by the current measuring device 17 and, in a first comparative step 41, the measurement is compared with the threshold $I_N$. If the output current $I_L$ is lower than the threshold $I_N$, a further measurement is taken and compared, and the electronic power supply device remains set so as to be able to deliver, upon demand, an output current to the low-voltage load 4 up to the predefined peak current value, until such time as the output current $I_L$ is equal to or greater than the threshold $I_N$.

In FIG. 2, in a schematic and purely exemplary manner, potential functional modules within the control logic circuit 18 are represented. A first comparator circuit 33 receives, on its first input, the value of the output current $I_L$ measured by the current measuring device 17, and the threshold $I_N$ is delivered by a control circuit 34 on its second input. If the output current $I_L$ is lower than the threshold $I_N$, an OR gate 35 will receive a logic signal 1 on one of its inputs, in consequence whereof the output of the OR gate 35, as the second manipulated variable 20 of the converter setting apparatus 16, signals that the DC voltage converter 11, if required, can deliver the maximum output current $I_{max}$.

Conversely, if the output current $I_L$ is equal to or greater than the threshold $I_N$, a first timer 36 is started. The first timer 36 receives a reference value for an output current pulse duration $t_{Pulse}$ transmitted by the control circuit 34. The control circuit 34 will have determined the output current pulse duration $t_{Pulse}$ in relation to the increased output current $I_L$—in the process diagram represented in FIG. 3, this is the determination step 42. The relationship of the output current pulse duration $t_{Pulse}$ to the increased output current stored in the control circuit 34 is represented, in an exemplary manner, in FIG. 4. For such time as the output current pulse duration $t_{Pulse}$ is not achieved, the first timer 36 will deliver a logic signal 1 on the input of the OR gate 35, and the output of the OR gate 35, as the second manipulated variable 20 of the converter setting apparatus 16, will signal that the DC voltage converter 11, if required, can deliver the maximum output current $I_{max}$. The output current $I_L$ is delivered to the level of the increased current value for the duration of the output current pulse duration thus determined.

Figure 8:
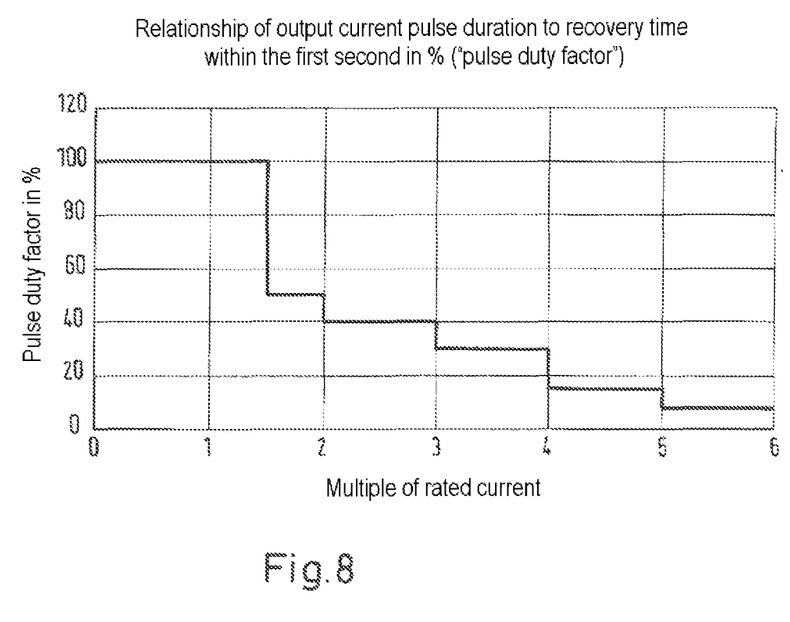
FIG. 8 the relationship of the output current pulse duration to the recovery time within the first second, in accordance with one form of embodiment of the method according to the invention.

In the second comparative step 43, it is determined when the output current pulse duration $t_{Pulse}$ has been achieved. This is determined in a two-fold manner. The output of the NOR gate 37, as a first manipulated variable 19 of the converter setting apparatus 16, signals that the DC voltage converter 11, if required, can only deliver a maximum output current up to the level of the threshold $I_N$. This is the delivery step 44 in the process sequence according to FIG. 3. Additionally, a second timer 38 is started. The second timer 38 receives a reference value for a recovery time $t_{recover}$ transmitted by the control circuit 34. The recovery time $t_{recover}$ is determined in the control circuit 34, in relation to the increased output current IL. The higher the output current, the longer the recovery time $t_{recover}$, and the shorter the output current pulse duration $t_{Pulse}$. In FIG. 8, this relationship is represented as the ratio of the output current pulse duration $t_{Pulse}$ to the recovery time $t_{recover}$ within the first second.

In a third comparative step 45, it is determined when the recovery time $t_{recover}$ has expired. If this has occurred, the OR gate 35 will again receive a logic signal 1 on one of its inputs, in consequence whereof the output of the OR gate 35, as a second manipulated variable 20 of the converter setting apparatus 16, will again signal that the DC voltage converter 11, if required, can deliver the maximum output current $I_{max}$. Further cycles can ensue, and the method can start again at the first step 40.

All the functional modules of the control logic circuit 18 described can either be configured in the form of hardware, as electronic circuits, or in the form of software, as program modules of an application program for a microprocessor.

Figure 4:
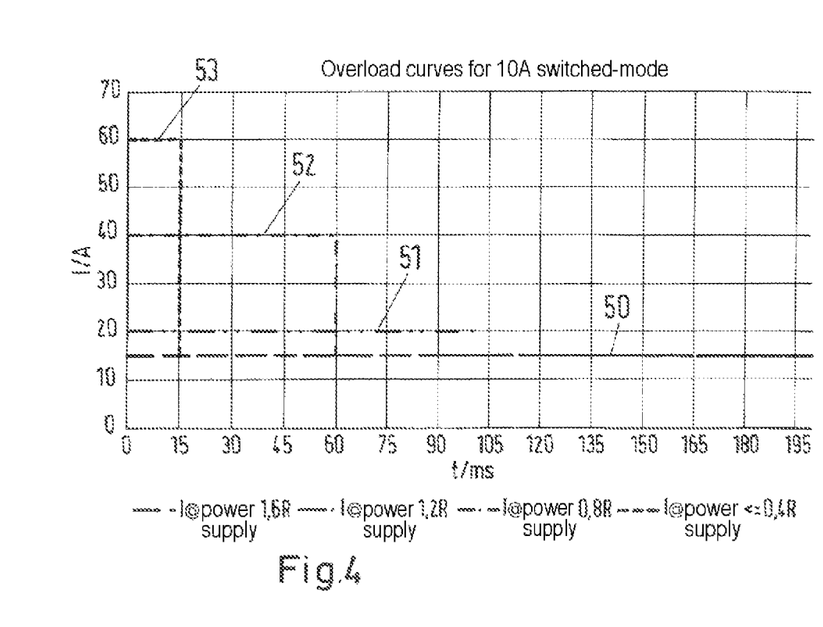
FIG. 4 shows a schematic representation of various overload curves in a switched-mode power supply according to the invention.
Figure 6:
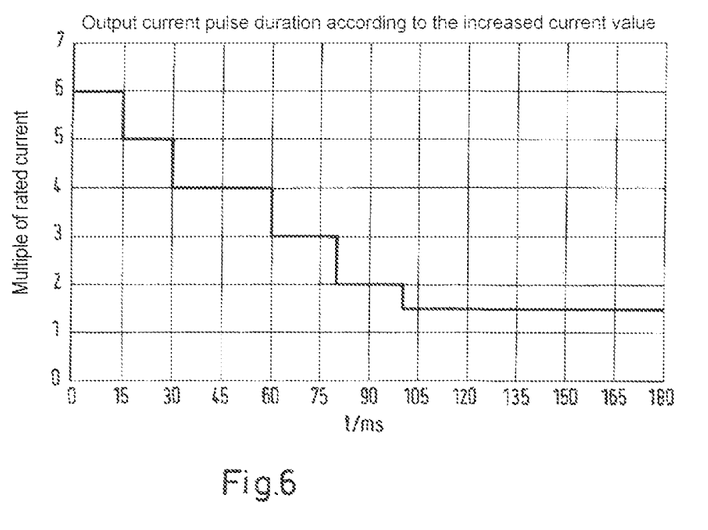
FIG. 6 a representation of the output current pulse duration in relation to the increased current value, according to one form of embodiment of the method according to the invention.

FIGS. 4, 6 and 8 will now be considered together. FIG. 4 shows a schematic representation of various overload curves for a 10 A switched-mode power supply according to the invention. FIG. 6 shows the output current pulse duration $t_{Pulse}$ in ms in relation to the increased output current $I_L$, as a multiple of the rated current. FIG. 8 shows the relationship of the output current pulse duration to the recovery time within the first second. The method according to the invention endeavors to execute as many current pulses as possible within the first second, in order, for example, to deliver optimum support for the start-up processes of electric motors.

Curve 50 in FIG. 4 shows a value of 1.6 ohms for the load 4. With an output voltage of 24V, the resulting current of 15 A can flow continuously. This corresponds to 1.5 times the rated current; in FIG. 6 it can be seen that, in this case, the output current pulse duration is unlimited, while in FIG. 8 it can be seen that, in this case, the pulse duty factor is 100%, such that no recovery time is required.

Curve 51 in FIG. 4 shows a value of 1.2 ohms for the load 4. An output voltage of 24V gives a resulting current of 20 A, corresponding to 2 times the rated current. In FIG. 6 it will be seen that the output current pulse duration is now 100 ms, and from FIG. 8 it moreover proceeds that the pulse duty factor is 50%, giving a recovery time of 100 ms.

Curve 52 in FIG. 4 shows a value of 0.8 ohms for the load 4. An output voltage of 24V gives a resulting current of 40 A, corresponding to 4 times the rated current. In FIG. 6 it will be seen that the output current pulse duration is now 60 ms, and from FIG. 8 it moreover proceeds that the pulse duty factor is 30%, giving a recovery time of 140 ms.

Curve 53 in FIG. 4 shows a value of 0.4 ohms for the load 4, which can correspond to an incipient short-circuit in the connected load circuit. An output voltage of 24V gives a resulting current of 60 A, corresponding to 6 times the rated current. In FIG. 6 it will be seen that the output current pulse duration is now 15 ms, and from FIG. 8 it moreover proceeds that the pulse duty factor is 7.5%, giving a recovery time of 185 ms.

Figure 5:
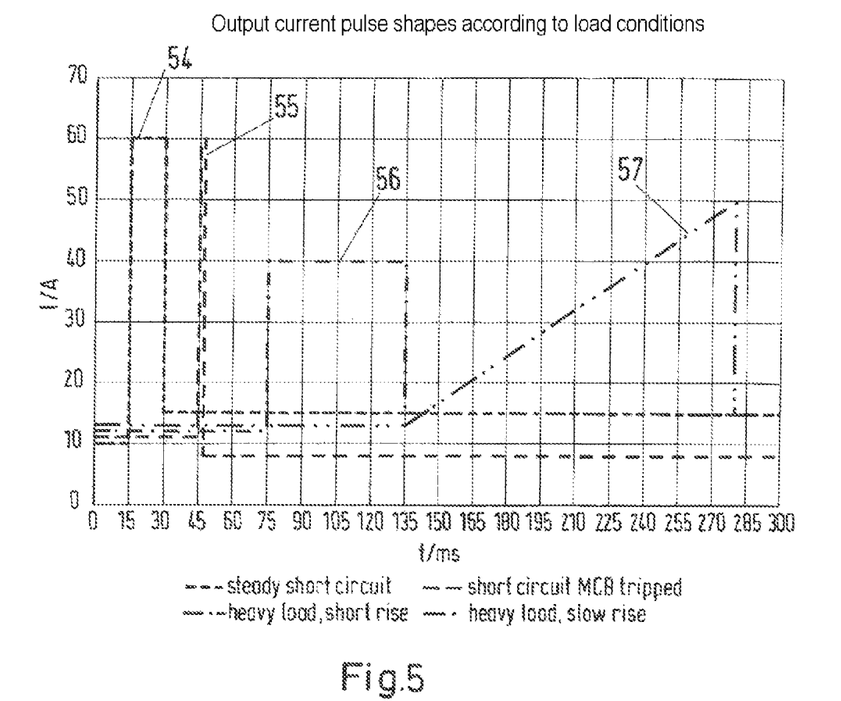
FIG. 5 a schematic representation of various output current pulses in accordance with the method according to the invention, under different load conditions.

FIG. 5 shows potential output current pulse shapes associated with the application of the method according to the invention, in relation to load conditions. Curve 54 represents the case in which a short-circuit is present in the external load circuit, but has not been switched-out, for example on the grounds that the protective device has not responded, for whatever reasons. Further to the output current pulse duration of 15 ms determined at 6 times the rated current—see above—the output current is limited to 1.5 times the rated current for a further 185 ms, and a further output current pulse at 6 times the rated current can then ensue. In FIG. 5, however, further pulses are not represented.

Curve 55 in FIG. 5 represents the case in which a short-circuit in a downstream power circuit has been switched-out by the protective device 5 within 3 ms. As further power circuits are connected, which draw a low output current, the output current in the present example, further to the switching-out of the short-circuit, falls to a low value of approximately 9 A.

Curve 56 in FIG. 5 represents the case of a heavy load which is switched-in very rapidly, corresponding to curve 52 in FIG. 4. In this case, the output current increases in a load-dependent manner to 60 A, as described above. Further to the expiry of the permitted load-dependent pulse duration of 60 ms, 1.5 times the rated current, i.e. 15 A, is restored in this case. Here again, further to the expiry of the recovery time of 140 ms, further pulses of 40 A and duration 60 ms can ensue, where applicable until such time as the heavy load condition is no longer in force.

Curve 57 in FIG. 5 represents the case of a heavy load which is switched in slowly. By the application of the method according to the invention, the output current increases here with a slow rising ramp, until it achieves the maximum value associated with the maximum switched-in load, in the present example 50 A, before the limitation of the output current is set to the threshold of 15 A, corresponding to 1.5 times the rated value.

The method according to the invention is thus characterized in that, further to the detection of an increased output current, the maximum duration of the output current pulse is determined in relation to the actual current flowing. This determination can be executed either in hardware or in firmware.

Further to the expiry of this pulse duration, the output current is limited to the permanently-supported output current, in order to permit the recovery of components.

Further cycles can follow thereafter.

Depending upon the load, cycles here are to be maintained as short as possible, in order to ensure optimum start-up phases, e.g. for the start-up of a motor as a load, with the simultaneous protection of internal components.

By means of short current pulses, with pause phases, protective elements can also cool down in the interim, in order to prevent any inadvertent thermal tripping.

The output capacitor 31 of the power supply 1 can support the initial current peaks, thereby protecting internal components.

Advantageously, the increased output current is made available by the power supply 1 temporally in advance of the detection of a special situation, for example a short-circuit, and not only in response to a special situation detected.

The duration of the current pulse is not fixed, but is directly dependent upon the capacity transmitted, and is thus adjusted in a load-dependent manner.

Figure 7:
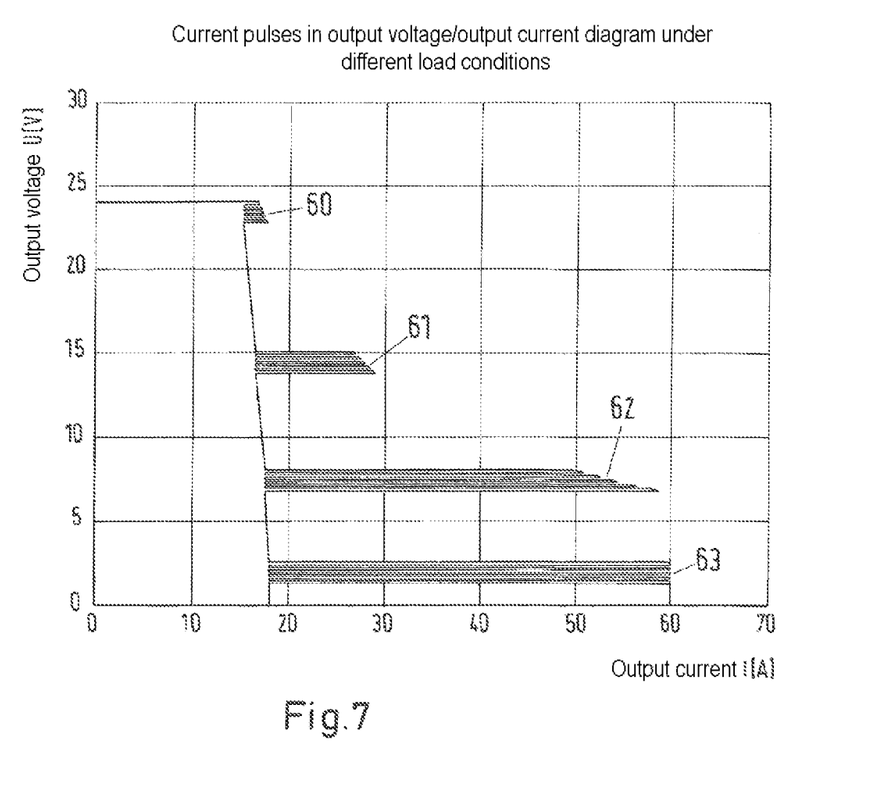
FIG. 7 a representation of current pulses in the output voltage/output current diagram, in accordance with the method according to the invention, under different load conditions.

For the delivery of an increased current, no distinction of a voltage threshold is required, such that the output voltage, depending upon the application, can remain in the rated range. FIGS. 4 and 5 thus show the behavior associated with a load of a substantially ohmic nature, wherein the output voltage initially remains at its rated value of 24V. FIG. 7 represents current pulses in an output voltage/output current diagram under various load conditions, involving loads which also feature a high capacitive component. In the event of a high capacitive load, the output voltage dips. Even under these load conditions, the method according to the invention generates a series of output current pulses with an increased output current value, wherein the magnitude of the output current pulse is load-dependent, and increases as the load increases. Thus, in FIG. 7, region 60 represents the output current pulse behavior associated with a low overload, followed by an increased overload in region 61, a further increased overload in region 62, and a very high load in region 63, for example a short-circuit. As the load increases, the output voltage continues to dip. Here again, the first output current pulse is tripped before the further drop in the output voltage.

Further to the undershoot of a current threshold, the present pulse is interrupted, in order to prevent any oscillation of a system comprising parallel-connected voltage supplies.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMBERS

1 electronic power supply device
2 output terminal
3 output terminal
4 low-voltage load
5 protective device
6 input terminal
7 input terminal
8 rectifier circuit
9 power factor conditioning (PFC) filter
10 HVDC bus
11 DC voltage converter, DC/DC converter
12 input terminal of DC/DC converter
13 input terminal of DC/DC converter
14 output terminal of DC/DC converter
15 output terminal of DC/DC converter
16 converter setting apparatus
17 current measuring device
18 control logic circuit
19 first manipulated variable
20 second manipulated variable
21 square-wave generator
22 Q1 switch
23 Q2 switch
24 resonant network
25 rectifier network
26 control circuit
27 capacitor C
28 stray inductance
29 magnetizing inductance
30 HF transformer 31 smoothing capacitor
32 full-bridge rectifier
33 first comparator circuit
34 control circuit
35 OR gate
36 first timer
37 NOR gate
38 second timer
40 first step
41 first comparative step
42 determination step
43 second process step
44 delivery step
45 third comparative step
50 Load curve at 24V and 1.6 ohms
51 Load curve at 24V and 1.2 ohms
52 Load curve at 24V and 0.8 ohms
53 Load curve at 24V and 0.4 ohms
54 current pulse associated with short-circuit, not cleared
55 current pulse associated with short-circuit, cleared
56 current pulse for a rapid heavy load switch-in
57 current pulse for a slow-rise heavy load
60 output current pulse behavior with a low overload
61 output current pulse behavior with a high overload
62 output current pulse behavior with an even higher overload
63 output current pulse behavior with a very high overload

The invention claimed is:

1. A method for supplying energy to a low-voltage load using an electronic power supply device, the method comprising:
   setting up the electronic power supply device so as to provide an output current to the low-voltage load up to a specified peak current value;
   providing the output current to the low-voltage load;
   monitoring the output current provided to the low-voltage load in order to detect an increase in the output current above a threshold which is lower than the specified peak current value;
   if an increase in the output current to an increased output current value higher than the threshold is detected, ascertaining an output current pulse duration based on the increased output current value;
   providing the output current to the low-voltage load at a level of the increased output current value for the output current pulse duration; and
   after expiration of the output current pulse duration, providing the output current to the low-voltage load at a level of the threshold.

2. The method of claim 1, further comprising:
   after expiration of the output current pulse duration, setting a delivery of the output current at the level of the threshold for a duration of a predefined recovery time; and
   after expiration of the duration of the predefined recovery time, resetting the electronic power supply device so as to deliver the output current to the low-voltage load up to the specified peak current value.

3. The method of claim 2, further comprising:
   determining the predefined recovery time in relation to the increased output current value.

4. The method of claim 1, further comprising:
   providing a protective device configured to protect the low-voltage load; and
   setting the peak current value sufficiently high to ensure secure tripping of the protective device.

5. The method of claim 1, wherein the longer the output current pulse duration is, the lower the increased output current value is.

6. The method of claim 1, further comprising, if the output current becomes equal to or lower than the threshold prior to expiration of the output current pulse duration:
   setting up the electronic power supply device to provide the output current up to the level of the threshold.

7. An electronic power supply device for supplying energy to a low-voltage load by delivery of a DC output voltage and an output current up to a peak current value, the electronic power supply device comprising:
   a detector which, in response to an increase in the output current above a predefined threshold, detects the increased output current, determines an output current pulse duration in relation to the increased output current, delivers the increased output current for a duration of the output current pulse duration, and, upon expiration of the output current pulse duration, delivers the output current at a level of the predefined threshold,
   wherein the electronic power supply device is configured as an electronic switched-mode power supply,
   wherein the electronic switched-mode power supply includes, incorporated therein, a DC voltage converter including an adjustable energy transmission ratio and a current measuring device configured to monitor the output current, and a setting apparatus configured to set an energy transmission ratio in relation to the output current, and
   wherein the DC voltage converter includes a half-bridge LLC resonant converter.

8. The electronic power supply device of claim 7, wherein the setting apparatus is further configured to influence a working frequency of the half-bridge LLC resonant converter.

* * * * *